United States Patent
Shi et al.

(10) Patent No.: US 11,505,187 B2
(45) Date of Patent: Nov. 22, 2022

(54) UNMANNED LANE KEEPING METHOD AND DEVICE, COMPUTER DEVICE, AND STORAGE MEDIUM

(71) Applicant: Guangzhou Automobile Group Co., Ltd., Guangdong (CN)

(72) Inventors: Hanfei Shi, Guangdong (CN); Qiaojun He, Guangdong (CN); Wei Xu, Guangdong (CN); Hongshan Zha, Guangdong (CN); Feng Pei, Guangdong (CN); Jun Gu, Guangdong (CN)

(73) Assignee: GUANGZHOU AUTOMOBILE GROUP CO., LTD., Guangzhou (CN)

(*) Notice: Subject to any disclaimer, the term of this patent is extended or adjusted under 35 U.S.C. 154(b) by 141 days.

(21) Appl. No.: 16/339,008

(22) PCT Filed: Oct. 22, 2018

(86) PCT No.: PCT/CN2018/111274
§ 371 (c)(1),
(2) Date: Apr. 3, 2019

(87) PCT Pub. No.: WO2019/179094
PCT Pub. Date: Sep. 26, 2019

(65) Prior Publication Data
US 2021/0339743 A1   Nov. 4, 2021

(30) Foreign Application Priority Data
Mar. 23, 2018 (CN) .......................... 201810247138.X (51) Int. Cl.
*B60W 30/12* (2020.01)
*G05B 13/02* (2006.01)
(Continued)

(52) U.S. Cl.
CPC .......... *B60W 30/12* (2013.01); *G05B 13/027* (2013.01); *G06K 9/6256* (2013.01);
(Continued)

(58) Field of Classification Search
CPC ......... B60W 2420/42; B60W 2540/18; B60W 2710/207; B60W 30/12; G05B 13/027;
(Continued)

(56) References Cited

U.S. PATENT DOCUMENTS 8,494,716 B1 * 7/2013 Lee ....................... G05D 1/0246
701/41
10,737,717 B2 * 8/2020 Peng ....................... G01S 19/45
(Continued)

FOREIGN PATENT DOCUMENTS

CN    106873566 A    6/2017
CN    107169402 A    9/2017
(Continued)

OTHER PUBLICATIONS

Bai, Chenjia: Research on Autonomous Driving Method Based on Computer Vision and Deep Learning. China Excellent Master's Thesis Full-text Database. Feb. 15, 2018(Feb. 15, 2018). Chapter 3-4.

*Primary Examiner* — Babar Sarwar
(74) *Attorney, Agent, or Firm* — ScienBiziP, P.C.

(57) ABSTRACT

The present disclosure relates to an unmanned lane keeping method and device, a computer device, and a storage medium. The method includes that: a vehicle road image collected by a data collector of the vehicle is received; the vehicle road image is transmitted to a preset DNN model of the vehicle for processing to obtain a steering wheel angle corresponding to the vehicle road image, wherein the DNN model of the vehicle is established by deep learning, and is used for characterizing a correspondence between the
(Continued)

vehicle road image and the steering wheel angle; and the vehicle is controlled to keep driving in a corresponding lane according to the steering wheel angle.

16 Claims, 7 Drawing Sheets

(51) Int. Cl.
    *G06K 9/62*     (2022.01)
    *G06N 3/04*     (2006.01)
    *G06N 3/08*     (2006.01)
    *G06V 10/20*     (2022.01)
    *G06V 20/56*     (2022.01)

(52) U.S. Cl.
    CPC ......... *G06K 9/6262* (2013.01); *G06N 3/0454* (2013.01); *G06N 3/08* (2013.01); *G06V 10/20* (2022.01); *G06V 20/588* (2022.01); *B60W 2420/42* (2013.01); *B60W 2540/18* (2013.01)

(58) Field of Classification Search
    CPC ...... G05D 1/02; G06K 9/6256; G06K 9/6262; G06K 9/6271; G06N 3/04; G06N 3/0454; G06N 3/063; G06N 3/08; G06T 7/90; G06V 10/20; G06V 10/454; G06V 10/82; G06V 20/588
See application file for complete search history.

(56) References Cited

U.S. PATENT DOCUMENTS

| | | | | |
|---|---|---|---|---|
| 2015/0203023 | A1* | 7/2015 | Marti | B60K 35/00 |
| | | | | 340/425.5 |
| 2018/0113477 | A1* | 4/2018 | Rodriguez | G05D 1/0061 |
| 2018/0354517 | A1* | 12/2018 | Banno | B60W 50/12 |
| 2018/0373980 | A1* | 12/2018 | Huval | G06K 9/6254 |
| 2018/0374359 | A1* | 12/2018 | Li | G06N 3/08 |
| 2019/0071091 | A1* | 3/2019 | Zhu | B60W 10/06 |
| 2019/0077398 | A1* | 3/2019 | Kusano | G06V 20/584 |
| 2019/0351918 | A1* | 11/2019 | Maeng | B60W 30/18163 |
| 2020/0184233 | A1* | 6/2020 | Berberian | G06T 7/74 |
| 2020/0385014 | A1* | 12/2020 | Hanniel | B60W 60/001 |
| 2021/0097309 | A1* | 4/2021 | Kaku | B60K 35/00 |
| 2021/0271898 | A1* | 9/2021 | Chen | G06V 20/588 |

FOREIGN PATENT DOCUMENTS

| | | | | |
|---|---|---|---|---|
| CN | 107226087 A | 10/2017 | | |
| CN | 107515607 A | 12/2017 | | |
| EP | 3219564 A1 * | 9/2017 | ............ | B60W 10/04 |
| EP | 3219564 A1 | 9/2017 | | |
| EP | 3495220 A1 * | 6/2019 | ............ | G05D 1/0221 |

\* cited by examiner

UNMANNED LANE KEEPING METHOD AND DEVICE, COMPUTER DEVICE, AND STORAGE MEDIUM

TECHNICAL FIELD

The present disclosure relates to the technical field of unmanned driving, and in particular, to an unmanned lane keeping method and device, a computer device, and a storage medium.

BACKGROUND

With the rapid development of the automobile industry and the improvement of people's living standards, automobiles have entered thousands of households as the main means of travel. During the driving process, people are easily affected by external factors and cannot keep automobiles in a lane, which is prone to traffic accidents. Studies have shown that traffic accidents caused by lane departures account for 20% of traffic accidents. In order to avoid such traffic accidents, an unmanned driving technology has been developed accordingly.

For lane keeping in conventional unmanned driving, a lane model is established according to artificial knowledge. In the real driving process, a lane marker is extracted by collecting a road image, then a lane offset is calculated according to the lane model, and a rotation angle segmentation Proportion Integral Derivative (PID) controller is used to calculate a steering wheel rotation angle compensation value required to correct a lane departure distance, and then corrects the vehicle lane departure. However, the conventional unmanned lane keeping method uses artificial knowledge to establish a corresponding lane model, so the recognition ability for a road segment with non-clear route, large curvature and traffic congestion is insufficient.

SUMMARY

In view of this, it is necessary to provide an unmanned lane keeping method and device, a computer device, and a storage medium, capable of improving the recognition ability for a road segment with non-clear route, large curvature and traffic congestion.

According to an embodiment of the present disclosure, an unmanned lane keeping method is provided, which may include: a vehicle road image collected by a data collector of the vehicle is received; the vehicle road image is transmitted to a DNN model of the vehicle for processing to obtain a steering wheel angle corresponding to the vehicle road image, wherein the DNN model of the vehicle is established by deep learning, and is used for characterizing a correspondence between the vehicle road image and the steering wheel angle; and the vehicle is controlled to keep driving in a corresponding lane according to the steering wheel angle.

In an embodiment, before a vehicle road image collected by a data collector of the vehicle is received, the method may further include that: a corresponding neural network, model is established based on a convolutional neural network; and training data is received, and a DNN model of the vehicle is established according to the training data and the neural network model, the training data including real vehicles and records of steering wheel angle.

In an embodiment, the step that training data is received and a DNN model of the vehicle is established according to the training data and the neural network model may include that: training data is received, and the training data is pre-processed; model training is performed according to pre-processed training data and the neural network model to obtain a training result; and a DNN model of the vehicle is established according to the training result.

In an embodiment, the step that training data is received and the training data is pre-processed may include that: training data is received, and a vehicle road image in the training data is randomly shifted, rotated, flipped, and cropped to obtain a pre-processed vehicle road image; and a steering wheel angle corresponding to the pre-processed vehicle road image is calculated to obtain pre-processed training data.

In an embodiment, the training data may include training set data, and the step that model training is performed according to pre-processed training data and the neural network model to obtain a training result may include that: a network training model corresponding to the pre-processed training data is established based on Tensorflow; and iterative training is performed on the network training model via the training set data according to the training set data and the neural network model to obtain a training result.

In an embodiment, the training data may further include validation set data, and the step that a DNN model of the vehicle is established according to the training result may include: a preliminary model is established according to the training result; and the preliminary model is validated according to the validation set data to obtain a DNN model of the vehicle.

In an embodiment, the step that the vehicle is controlled to keep driving in a corresponding lane according to the steering wheel angle may include that: the steering wheel angle is sent to a steering control system, the steering wheel angle being used for the steering control system to control vehicle steering to make the vehicle keep driving in a corresponding lane.

According to another embodiment of the present disclosure, an unmanned lane keeping device is provided, which may include: a vehicle road image receiving module, configured to receive a vehicle road image collected by a data collector of the vehicle; a vehicle road inference module, configured to transmit the vehicle road image to a preset DNN model of the vehicle for processing to obtain a steering wheel angle corresponding to the vehicle road image, wherein the DNN model of the vehicle is established by deep learning, and is used for characterizing a correspondence between the vehicle road image and the steering wheel angle; and a steering wheel angle control module, configured to control the vehicle to keep driving in a corresponding lane according to the steering wheel angle.

According to an embodiment of the present disclosure, a computer device is also provided, and the computer device may include a memory and a processor. The memory storing a computer program, wherein when executing the computer program, the processor implements the steps of the above-mentioned method.

According to an embodiment of the present disclosure, a computer-readable storage medium is also provided, and the computer-readable storage medium may have a computer program stored thereon, wherein the computer program is executed by a processor to implement the steps of the above-mentioned method.

According to the above-mentioned unmanned lane keeping method and device, computer device and storage medium, a large amount of real vehicle data is collected as training data, deep learning is performed through a deep neural network to establish a corresponding real vehicle inference model, and during the actual driving process, a corresponding steering wheel angle can be obtained via the real vehicle inference model according to a collected vehicle road image, so as to control a vehicle to keep driving in a corresponding lane. The characterization of road information can be completed without artificial knowledge, and feature information that has deep internal understanding of a lane and cannot be obtained by artificial knowledge can also be learned by deep learning, lane keeping in a situation of a road segment with non-clear route, large curvature and traffic congestion can be achieved, and the advantage of strong recognition ability is achieved.

DETAILED DESCRIPTION OF THE EMBODIMENTS

In order to make the purposes, technical solutions and advantages of the present disclosure clearer, the present disclosure will be further described in detail below with reference to the accompanying drawings and embodiments. It is to be understood that the specific embodiments described herein are merely illustrative of the present disclosure and are not intended to limit the present disclosure.

Figure 1:
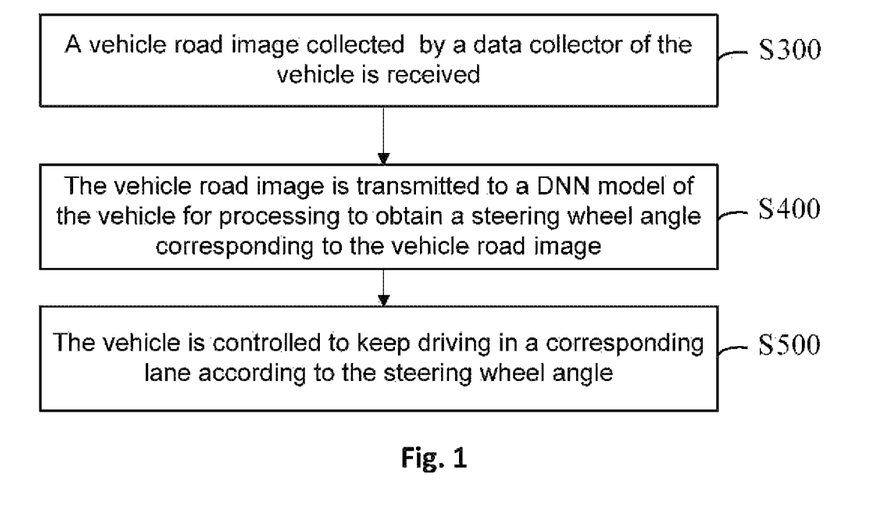
FIG. 1 is a flowchart of an unmanned lane keeping method in an embodiment.

In an embodiment, referring to FIG. 1, an unmanned lane keeping method includes the steps as follows.

At S300, a vehicle road image collected by a data collector of the vehicle is received. Specifically, real-time road information of a vehicle during the driving process is collected according to a data collector of the vehicle in real time. Further, the data collector of the vehicle may be a camera. During the driving process of the vehicle, the camera takes a photo at a specific frequency to obtain a corresponding vehicle road image.

At S400, the vehicle road image is transmitted to a preset DNN model of the vehicle for processing to obtain a steering wheel angle corresponding to the vehicle road image.

The DNN model of the vehicle is established by deep learning, and is used for characterizing a correspondence between the vehicle road image and the steering wheel angle. Specifically, after being collected by the data collector of the vehicle, the vehicle road image is transmitted to a preset DNN model of the vehicle for real vehicle inference to obtain a steering wheel angle corresponding to the collected vehicle road image. The preset DNN model of the vehicle refers to a model that characterizes a relationship between the vehicle road image and the steering wheel angle and is established by deep learning according to the collected vehicle road image and the steering wheel angle in the actual driving process.

Further, in an embodiment, the vehicle road image is a Red Green Blue (RGB) image, when being transmitted, the RGB vehicle road image is split into three channels namely R, G, and B, and a corresponding message header and message tail are added to each channel. When the RGB vehicle road image is received, the validation is performed. When the R, G, and B channels of the same image are completely received, the validation is completed, otherwise the validation fails. After the RGB vehicle road image that has been successfully validated is normalized, the DNN model of the vehicle is inferred, and the vehicle road image that fails the validation will be discarded. When the vehicle road image is normalized, an RGB value of the vehicle road image is normalized from 0-255 to [−1, 1]. The RGB vehicle road image of each frame is encapsulated into three frames socket udp frames. Taking the sampling frequency of 30 Hz as an example, the transmission loss time of completing one frame of RGB vehicle road image is less than 200 us, which meets the requirements of real-time performance. socket udp is a general-purpose way of big datagram communication. It has easy-to-obtain interface functions in C++ and Python, complex debugging caused by c++ and python can be avoided, and problem finding is facilitated, thus shortening development time.

At step S500, the vehicle is controlled to keep driving in a corresponding lane according to the steering wheel angle. Specifically, after inferring the steering wheel angle corresponding to the collected vehicle road image according to the DNN model of the vehicle, the vehicle is controlled to perform steering according to the obtained rotation angle, and keeps driving in an appropriate lane.

Figure 2:
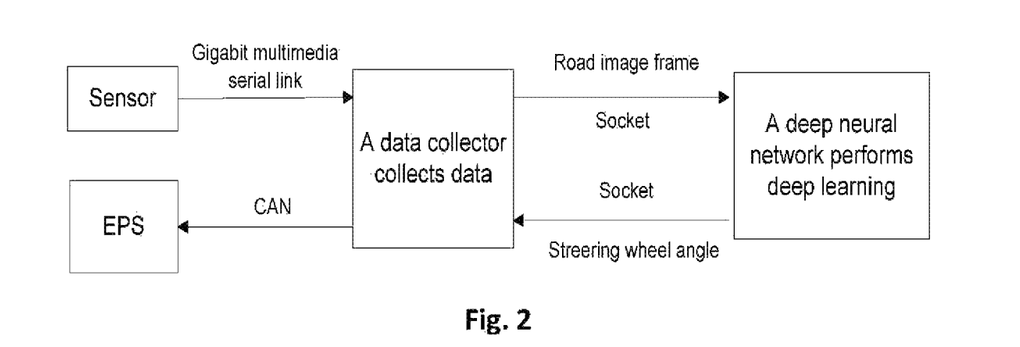
FIG. 2 is a schematic diagram of steering wheel angle control in an embodiment.

Further, referring to FIG. 2, in an embodiment, step S500 includes: sending the steering wheel angle to a steering control system, the steering wheel angle being used for the steering control system to control vehicle steering to make the vehicle keep driving in a corresponding lane. Specifically, after the DNN model of the vehicle is inferred to obtain the steering wheel angle corresponding to the collected vehicle road image, the obtained steering wheel angle is sent to a data collection end, and then the data, collection end sends the steering wheel angle to an Electric Power Steering (EPS), thereby controlling the vehicle to perform steering, so that the vehicle keeps driving in the corresponding lane. Further, when the DNN model of the vehicle sends the inferred corresponding steering wheel angle to the data collection end, the steering wheel angle is transmitted through a socket (used for data exchange between two programs), and the data collection end sends the steering wheel angle to the EPS through a Controller Area Network (CAN). The closed-loop control of vehicle steering is completed in the above manner, and the advantages of high control smoothness and high generalization capability are achieved.

Figure 3:
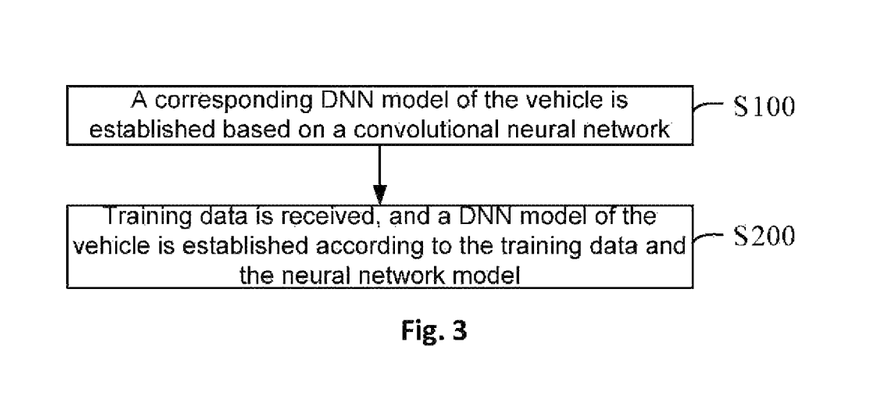
FIG. 3 is a flowchart of establishing a DNN model of the vehicle in an embodiment.

In an embodiment, referring to FIG. 3, step S100 and step S200 are further included before step S300.

Figure 4:
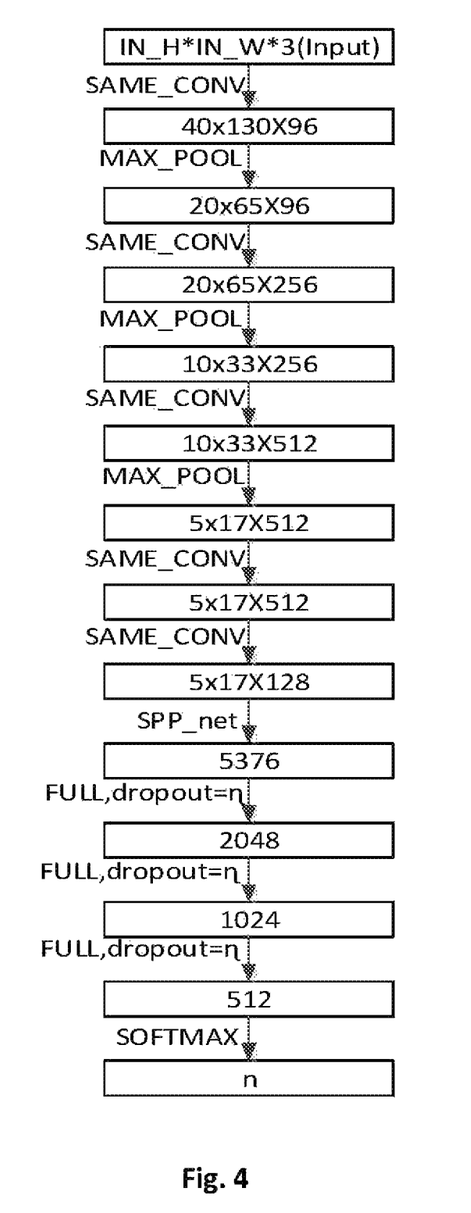
FIG. 4 is a schematic diagram of a neural network in an embodiment.

At step S100, a corresponding neural network model is established based on a convolutional neural network. In the process of lane keeping, the corresponding steering wheel angle is obtained according to the input vehicle road image. Therefore, lane keeping can be regarded as an image processing problem. Since a convolutional neural network has a strong advantage in image classification processing, the convolutional neural network is used as the main component of a neural network. Specifically, referring to FIG. 4, in an embodiment, the convolutional neural network is divided into 14 layers: one input layer; five convolutional layers, wherein the convolutional layers are sparsely connected to implement image local feature extraction; three max_pooling (maximum pooling) layer, wherein the main role of the pooling layer is to downsample a feature map and integrate features; three full connection layers, wherein the role is to map "distributed feature representation" to a sample mark space, which can be considered as a weighted sum of previously extracted local features; one spp_net (space pyramid pooled network) layer, wherein a spp_net layer is added between the last convolutional layer and the full connection layer, so that the model is adapted to multiple size inputs; and one n-class softmax (classification probability function, which maps an output value to a classification probability) output layer, wherein a 1-dimensional vector of a length n is output, and an index number of an element with the largest vector value is a steering wheel rotation angle value predicted from an input image. Except the softmax layer, the output of each layer is subjected to an activation function to enhance the nonlinear network expression. Because there is a certain similarity between samples, each full connection layer is provided with dropout during the training process to suppress over-fitting. Droptout is used to invalidate neurons with a certain probability during the training process.

Further, in an embodiment, training data is also collected before step S100.

Specifically, during the manual driving process, the front vehicle road image and the steering wheel angle during, lane keeping are collected in real time at a specific frequency, and the collected vehicle road image and the steering wheel angle are saved. Further, the vehicle road image is collected at a frequency of 30 Hz and a pixel of 1280*1080, the collected vehicle road image is saved in a video format, a time stamp of the captured video is recorded in a tart file, the steering wheel angle is collected at a frequency of 100 Hz, and the collected steering wheel angle and the corresponding time stamp are saved in a binary bin file. It can be understood that the collection frequency of the vehicle road image and the steering wheel angle is not limited to the sampling frequency listed in the present embodiment, and the vehicle road image and the steering wheel angle can be sampled at other frequencies, as long as the sampling frequency of the steering wheel angle is larger than the sampling frequency of the vehicle road image, the collection pixels of the vehicle road image are not limited to 1280*1080, and the storage form of the document is not limited to the present embodiment, as long as information in the training data can be saved.

Furthermore, in an embodiment, a training database is also established after the training data is collected. Specifically, the collected data is divided into four categories: straightway, curve, left deviation correction, and right deviation correction. The straightway is mainly used for normal driving, and the other three types are mainly used to correct the vehicle after it deviates from the lane. In the normal driving process, most of the data are straightway, data, so the straightway data has a large proportion. In order to balance the data, the straightway data is downsampled by a downsample factor γ (greater than 1), and the other data maintains an original sampling frequency. Since the collection frequency of the steering wheel angle is high, in order to make a data set contain more original information, the collection time of the steering wheel angle is taken as the reference, and an image that was collected before and is closest in terms of time serves as an image corresponding to a current steering wheel rotation angle. The vehicle road image and the steering wheel angle are synchronized. When the vehicle road image is collected with pixels of Ser. No. 12/801,080, the field of view obtained for the lane keeping is too broad, and the input size of a picture is larger during training, so that not only network parameters will increase, but also irrelevant, factors introduced for the lane keeping will also increase. In order to identify the irrelevant factors, the amount of data will increase exponentially. Therefore, a vehicle front road image H*W (H<1280, W<1080) is taken at the height of H pixels and the length of W pixels. The specific size may be adjusted according to the actual situation. Since an HDF5 file is easier to apply in machine learning and, control software, the HDF5 file is selected to store the video and the steering wheel angle, and the order of images in the file is the same as the order of video frames in the corresponding video. By establishing a corresponding training database, it is convenient to extract training data in the subsequent training process.

At step S200, training data is received, and a DNN model of the vehicle is established according to the training data and the neural network model. Specifically, the training data includes real vehicles and records of steering wheel angle, and deep learning is performed according to the received training data based on the neural network model to establish the DNN model of the vehicle.

Figure 5:
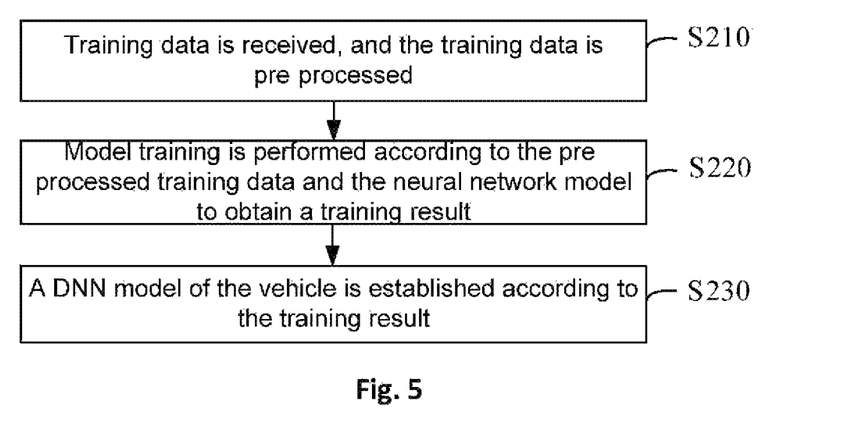
FIG. 5 is a flowchart of establishing a DNN model of the vehicle in another embodiment.

Further, referring to FIG. 5, in an embodiment, step S200 includes step S210, step S220, and step S230. At step S210, training data is received, and the training data is pre-processed. Specifically, the collected training data is pre-processed to expand the number of training data and increase the diversity of samples.

Figure 6:
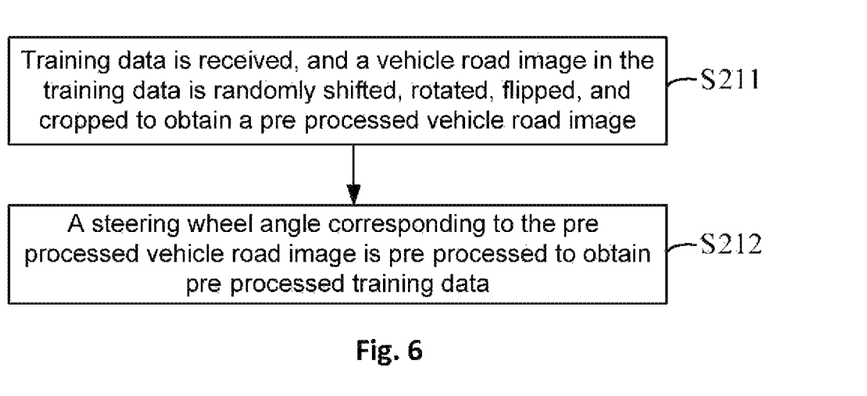
FIG. 6 is a flowchart of pre-processing training data in an embodiment.

Furthermore, referring to FIG. 6, in an embodiment, step S210 includes step S211 and step S212.

At step S211, training data is received, and a vehicle road image in the training data is randomly shifted, rotated, flipped, and cropped to obtain a pre-processed vehicle road image, Specifically, each of the collected vehicle road images is randomly shifted, rotated, and flipped with a certain probability level, then the H*W image is cropped to an IN_H*IN_W pixel, and the large-sized image is cropped into a small image after transformation, which is mainly to prevent the cropped image from appearing in a small range of black frames. When the H*W image is cropped, appropriate pixels are selected for cropping according to the size of H*W. When cropping, the proportion of other irrelevant information in the vehicle road image is reduced to the greatest extent, thereby ensuring the proportion of road information in the vehicle road image.

At step S212, a steering wheel angle corresponding to the pre-processed vehicle road image is pre-processed to obtain pre-processed training data. Specifically, the steering wheel angle corresponding to the pre-processed vehicle road image is obtained by calculation. It is obtained by the following transformation formula:

$$\text{steer\_out} = \text{sym\_symbol} * (\text{steer\_init} + \text{pix\_shift} * \alpha - \text{pix\_rotate} * \beta)$$

where α is a transformation coefficient of an angle corresponding to a random shift pixel, and β is a transformation coefficient of a steering wheel rotation angle corresponding to image rotation. steer_out is an angle value corresponding to a transformed image. sym_symbol is a horizontally symmetric identifier of the image, which is an explicit function. When sym_symbol is −1, it indicates horizontal symmetry. When sym_symbol is 1, it indicates no horizontal symmetry. The calculation formula is as follows:

$$\text{sym\_symbol} = \begin{cases} 1 & (f(-T, T) \geq 0) \\ -1 & (f(-T, T) < 0) \end{cases}$$

f(−T,T) represents that a random integer is generated in a [−T, T] closed interval with an equal probability, and T is an integer that is not zero. The following formulas pix_shift and pix_rotate are similar, and M and K both represent non-zero arbitrary integers. The benefit of horizontal symmetry of an image is to balance the habitual tendency of a steering wheel angle of a vehicle in samples when it is not in the middle of a lane. steer_init is a collected original steering wheel angle, and pix_shift is the number of pixels randomly shifted in a horizontal direction. The calculation mode is as follows:

$$\text{pix\_shift} = f(-M, M)$$

A negative number indicates that a sliding frame of a size IN_H*IN_W is shifted to the left on an H*W map, and vice versa. pix_rotate is a rotation angle of an H*W image for rotation transformation. The calculation formula is as follows:

$$\text{pix\_rotate} = f(-K, K)$$

A steering, wheel angle corresponding to the pre-processed vehicle road image may be obtained according to the above calculation formula, so as to obtain pre-processed training data.

At step S220, model training is performed according to the pre-processed training data and the neural network model to obtain a training result. Specifically, model training is performed according to a great amount of pre-processed training data based on the neural network model to obtain a corresponding training result.

Figure 7:
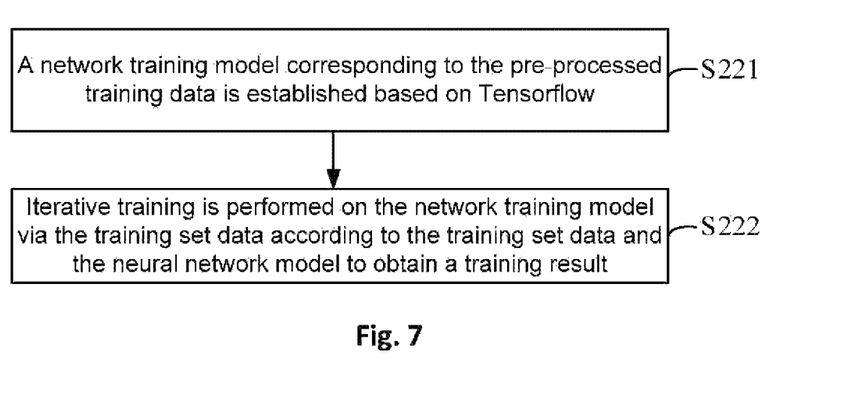
FIG. 7 is a flowchart of model training in an embodiment.

Further, in an embodiment, referring to FIG. 7, step S220 includes step S221 and step S222. At step S221, a network training model corresponding to the pre-processed training data is established based on Tensorflow. Specifically, Tensorflow is an intelligent learning system that transmits complex data structures to an artificial intelligence neural network for analysis and processing. A network training model corresponding to the pre-processed training data is established based on Tensorflow, thereby facilitating subsequent iterative training of the pre-processed training data.

At step S222, iterative training is performed on the network training model via the training set data according to the training set data and the neural network model to obtain a training result. Specifically, the training set data is randomly scrambled before the training connection is performed, the correlation between the samples is broken, and the reliability of the training result is increased. Furthermore, in an embodiment, the training data is loaded in batches due to the large capacity of the obtained training data, and the loaded training data of each batch is different according to different configurations of servers for training. The selection can be made according to the actual situation, in order to facilitate the expansion, training data storage and iterative training can be performed by different servers, and data transmission is performed between the two servers through a socket. It can be understood that the training data can be loaded into the network training model at one time under the premise of server configuration permission, and the training data storage and the iterative training can also be performed by the same server.

At step S230, a DNN model of the vehicle is established according to the training result. Specifically, based on a Tensorflow network training model, the corresponding training is performed according to the received training data, a training result about the correspondence between the vehicle road image and the steering wheel angle is obtained and saved, and the corresponding DNN model of the vehicle is established according to the training result of a great amount of training data.

Figure 8:
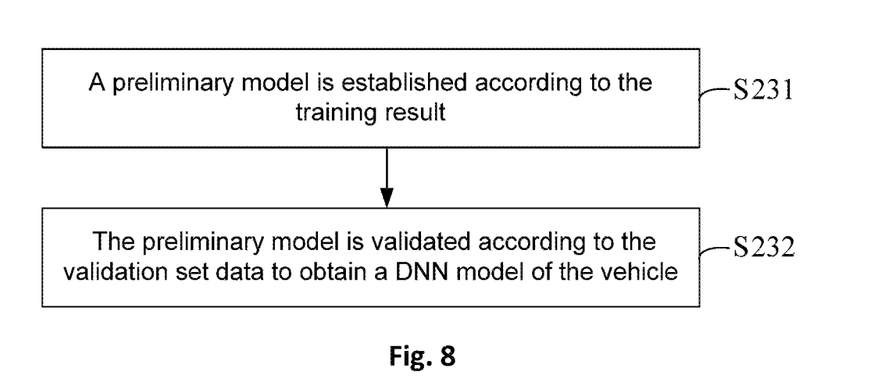
FIG. 8 is a flowchart of model validation in an embodiment.
Figure 9:
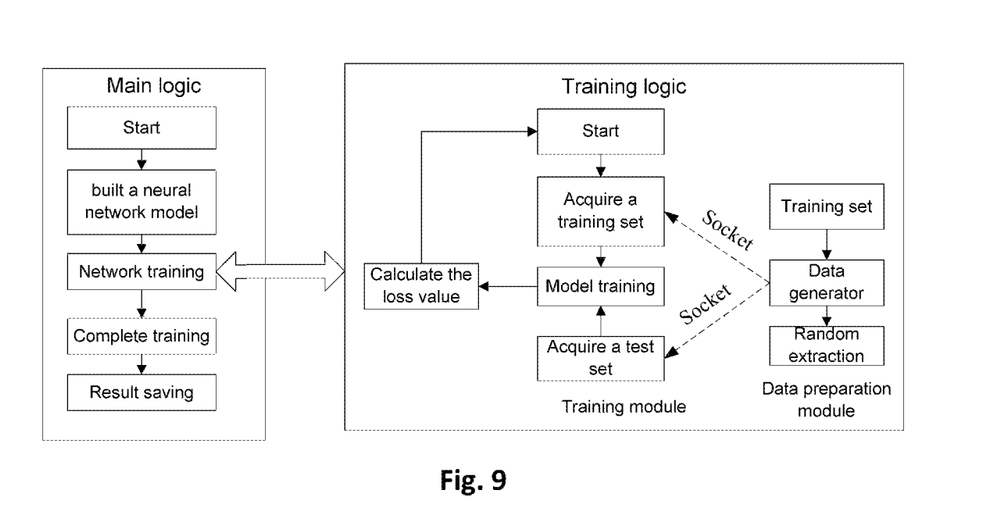
FIG. 9 is a structural schematic diagram of network training in an embodiment.

Further, in an embodiment, referring to FIG. 8 to FIG. 9, the training data further includes validation set data, and step S230 includes step S231 and step S232. At step S231, a preliminary model is established according to the training result. Specifically, based on the Tensorflow network training model and the neural network model, the Tensorflow network training model is iteratively trained according to the training set data, and a correspondence between the vehicle road image and the steering wheel angle is obtained, and a preliminary model is established according to the obtained correspondence. Further, the model training adopts mini-batch Stochastic Gradient Descent (SGD) as an optimizer, an initial learning rate is δ, the learning rate is exponentially decayed by a coefficient θ, and the learning rate is attenuated after the training times reach a set value. Specifically, the set value is determined according to the experience accumulated by multiple trainings.

At step S232, the preliminary model is validated according to the validation set data to obtain a DNN model of the vehicle. Specifically, after performing iterative training according to the training set data, a preliminary model about the correspondence between the vehicle road image and the steering wheel angle is established according to the training result, then the obtained preliminary model is subjected to capability assessment based on the validation set data, and the change trend of the loss value or accuracy of the preliminary model on the validation set determines whether to terminate the training. Further, in order to prevent accidental interruption of a training program, the training result of the model is saved once a certain amount of training data is trained.

Furthermore, in an embodiment, the training data further includes test set data, after the preliminary training is completed according to the training set data and the validation set validates the preliminary model to obtain the DNN model of the vehicle, the obtained DNN model of the vehicle is subjected to model prediction through the test set data, and the performance and classification capabilities of the established DNN model of the vehicle are measured to obtain and output a result. The obtained training data is divided into training set data, validation set data and test set data, which effectively prevents over-fitting of the model and further improves the reliability of the established DNN model of the vehicle.

According to the above-mentioned unmanned lane keeping method, a large amount of real vehicle data is collected as training data, deep learning is performed through a deep neural network to establish a corresponding real vehicle inference model, and during the actual driving process, a corresponding steering wheel angle can be obtained via the real vehicle inference model according to a collected vehicle road image, so as to control a vehicle to keep driving in a corresponding lane. The characterization of road information can be completed without artificial knowledge, and feature information that has deep internal understanding of a lane and cannot be obtained by artificial knowledge can also be learned by deep learning, lane keeping in a situation of a road segment with non-clear route, large curvature and traffic congestion can be achieved, and the advantage of strong recognition ability is achieved.

Figure 10:
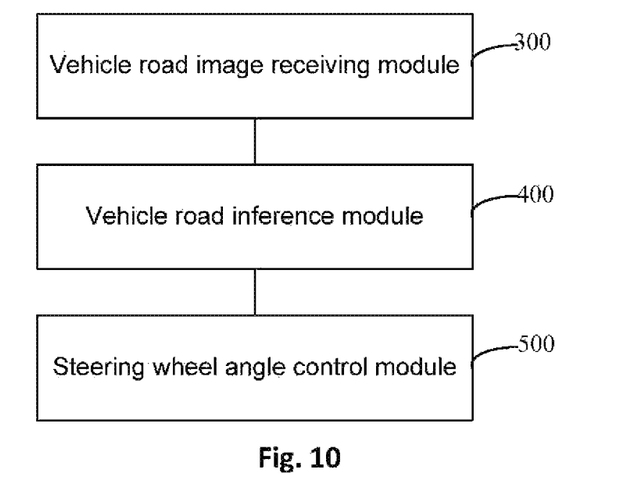
FIG. 10 is a structural schematic diagram of an unmanned lane keeping device in an embodiment.

Referring to FIG. 10, an unmanned lane keeping device includes a vehicle road image receiving module 300, a vehicle road inference module 400 and a steering wheel angle control module 500.

The vehicle road image receiving module 300 is configured to receive a vehicle road image collected by a data collector of the vehicle. Specifically, real-time road information of a vehicle during the driving process is collected according to a data collector of the vehicle in real time. Further, the data collector of the vehicle may be a camera. During the driving process of the vehicle, the camera takes a photo at a specific frequency to obtain a corresponding vehicle road image.

The vehicle road inference module 400 is configured to transmit the vehicle road image to a preset DNN model of the vehicle for processing to obtain a steering wheel angle corresponding to the vehicle road image.

The DNN model of the vehicle is established by deep learning, and is used for characterizing a correspondence between the vehicle road image and the steering wheel angle. Specifically, after being collected by the data collector of the vehicle, the vehicle road image is transmitted to a preset DNN model of the vehicle for real vehicle inference to obtain a steering wheel angle corresponding to the collected vehicle road image. The preset DNN model of the vehicle refers to a model that characterizes a relationship between the vehicle road image and the steering wheel angle and is established by deep learning according to the collected vehicle road image and the steering wheel angle in the actual driving process.

Further, in an embodiment, the vehicle road image is an RGB image, when being transmitted, an RGB vehicle road image is split into three channels namely R, G, and B, and a corresponding message header and message tail are added to each channel. When the RGB vehicle road image is received, the validation is performed. When the R, G, and B channels of the same image are completely received, the validation is completed, otherwise the validation fails. After the RGB vehicle road image that has been successfully validated is normalized, the DNN model of the vehicle is inferred, and the vehicle road image that fails the validation will be discarded. When the vehicle road image is normalized, an RGB value of the vehicle road image is normalized from 0-255 to [−1, 1]. The RGB vehicle road image of each frame is encapsulated into three socket udp frames. Taking the sampling frequency of 30 Hz as an example, the transmission loss time of completing one frame of RGB vehicle road image is less than 200 us, which meets the requirements of real-time performance. socket udp is a general-purpose big datagram communication method. It has easy-to-obtain interface functions in C++ and Python, complex debugging caused by c++ and python can be avoided, and problem finding is facilitated, thus shortening development time.

The steering wheel angle control module 500 is configured to control the vehicle to keep driving in a corresponding lane according to, the steering wheel angle. Specifically, after inferring the steering wheel angle corresponding to the collected vehicle road image according to the DNN model of the vehicle, the vehicle is controlled to perform steering according to the obtained rotation angle, and keeps driving in an appropriate lane.

Further, referring to FIG. 2, in an embodiment, the steering wheel angle control module 500 is configured to send the steering wheel angle to a steering control system, the steering wheel angle being used for the steering control system to control vehicle steering to make the vehicle keep driving in a corresponding lane. Specifically, after the DNN model of the vehicle is inferred to obtain the steering wheel angle corresponding to the collected vehicle road image, the obtained steering wheel angle is sent to a data collection end, and then the data collection end sends the steering wheel angle to an EPS, thereby controlling the vehicle to perform steering, so that the vehicle keeps driving in the corresponding lane. Further, when the DNN model of the vehicle sends the inferred corresponding steering wheel angle to the data collection end, the steering wheel angle is transmitted through a socket (used for data exchange between two programs), and the data collection end sends the steering wheel angle to the EPS through a CAN. The closed-loop control of vehicle steering is completed in the above manner, and the advantages of high control smoothness and high generalization capability are achieved.

Figure 11:
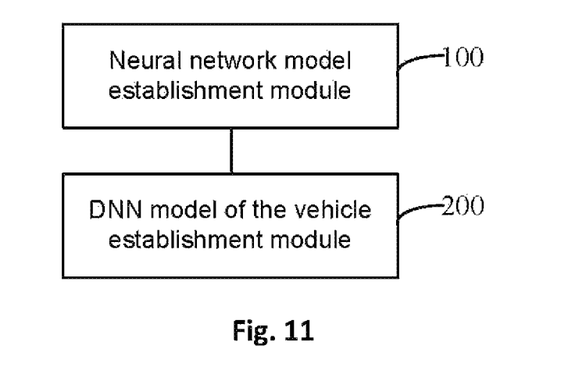
FIG. 11 is a structural schematic diagram of establishing a DNN model of the vehicle in an embodiment.

In an embodiment, referring to FIG. 11, the unmanned lane keeping device further includes a neural network model establishment module 100 and a DNN model of the vehicle establishment module 200.

The neural network model establishment module 100 is configured to establish a corresponding neural network model based on a convolutional neural network. In the process of lane keeping, the corresponding steering wheel angle is obtained according to the input vehicle road image. Therefore, lane keeping can be regarded as an image processing problem. Since a convolutional neural network has a strong advantage in image classification processing, the convolutional neural network is used as the main component of a neural network. Specifically, referring to FIG. 4, in an embodiment, the convolutional neural network is divided into 14 layers: one input layer; five convolutional layers, wherein the convolutional layers are sparsely connected to implement image local feature extraction; three max_pooling layer, wherein the main role of the pooling layer is to downsample a feature map and integrate features; three full connection layers, wherein the role is to map "distributed feature representation" to a sample mark space, which can be considered as a weighted sum of previously extracted local features; one spp_net layer, wherein a spp_net layer is added between the last convolutional layer and, the full connection layer, so that the model is adapted to multiple size inputs; and one n-class softmax output layer, wherein a 1-dimensional vector of a length n is output, and an index number of an element with the largest vector value is a steering wheel rotation angle value predicted from an input image. Except the softmax layer, the output of each layer is subjected to an activation function to enhance the nonlinear network expression. Because there is a certain similarity between samples, each full connection layer is provided with dropout during the training process to suppress overfitting. Dropout is used to invalidate neurons with a certain probability during the training process.

Further, in an embodiment, the neural network model establishment module 100 also collects training data before establishing a corresponding neural network model based on a convolutional neural network.

Specifically, during the manual driving process, the front vehicle road image and the steering wheel angle during lane keeping are collected in real time at a specific frequency, and the collected vehicle road image and the steering wheel angle are saved. Further, the vehicle road image is collected at a frequency of 30 Hz and a pixel of 1280*1080, the collected vehicle road image is saved in a video format, a time stamp of the captured video is recorded in a txt file, the steering wheel angle is collected at a frequency of 100 Hz, and the collected steering wheel angle and the corresponding time stamp are saved in a binary bin file. It can be understood that the collection frequency of the vehicle road image and the steering wheel angle is not limited to the sampling frequency listed in the present embodiment, and the vehicle road image and the steering wheel angle can be sampled at other frequencies, as long as the sampling frequency of the steering wheel angle is larger than the sampling frequency of the vehicle road image, the collection pixels of the vehicle road image are not limited to 1280*1080, and the storage form of the document is not limited to the present embodiment, as long as information in the training data can be saved.

Furthermore, in an embodiment, a training database is also established after the training data is collected. Specifically, the collected data is divided into four categories: straightway, curve, left bias, and right bias. The straightway is mainly used for normal driving, and the other three types are mainly used to correct the vehicle after it deviates from the lane. In the normal driving process, most of the data are straightway data, so the straightway data has a large proportion. In order to balance the data, the straightway data is downsampled by a downsample factor γ (greater than 1), and the other data maintains an original sampling frequency. Since the collection frequency of the steering wheel angle is high, in order to make a data set contain more original information, the collection time of the steering wheel angle is taken as the reference, and an image that was collected before and is closest in terms of time serves as an image corresponding to a current steering wheel rotation angle. The vehicle road image and the steering wheel angle are synchronized. When the vehicle road image is collected with pixels of 1280*1080, the field of view obtained for the lane keeping is too broad, and the input size of a picture is larger during training, so that not only network parameters will increase, but also irrelevant factors introduced for the lane keeping will also increase. In order to identify the irrelevant factors, the amount of data will increase exponentially. Therefore, a vehicle front road image H*W (H<1280, W<1080) is taken at the height of H pixels and the length of W pixels. The specific size may be adjusted according to the actual situation. Since an HDF5 file is easier to apply in machine learning and control software, the HDF5 file is selected to store the video and the steering wheel angle, and the order of images in the file is the same as the order of video frames in the corresponding video. By establishing a corresponding training database, it is convenient to extract training data in the subsequent training process.

The DNN model of the vehicle establishment module 200 is configured to receive training data, and establish a DNN model of the vehicle according to the training data and the neural network model. Specifically, the training data includes real vehicles and records of steering wheel angle, and deep learning is performed according to the received training data based on the neural network model to establish the DNN model of the vehicle.

Figure 12:
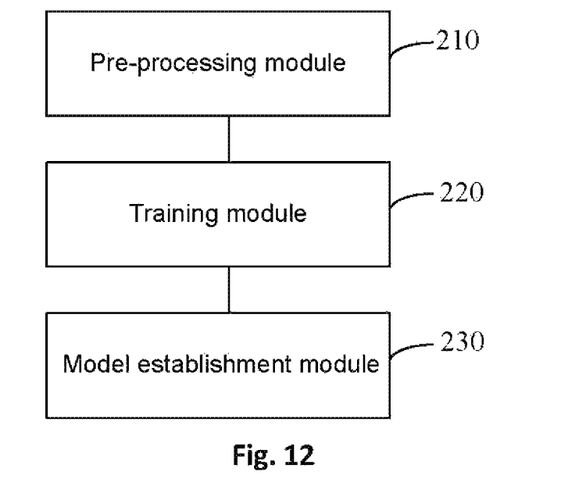
FIG. 12 is a structural schematic diagram of establishing a DNN model of the vehicle in another embodiment.

Further, referring to FIG. 12, in an embodiment, the DNN model of the vehicle establishment module 200 includes a pre-processing module 210, a training module 220 and a model establishment module 230, The pre-processing module 210 is configured to receive training data, and pre-process the training data. Specifically, the collected training data is pre-processed to expand the number of training data and increase the diversity of samples.

Figure 13:
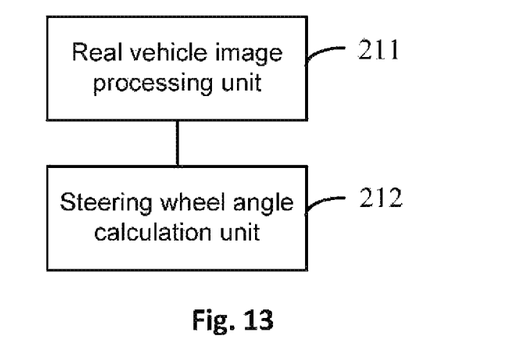
FIG. 13 is a structural schematic diagram of pre-processing training data in an embodiment.

Furthermore, referring to FIG. 13, in an embodiment, the pre-processing module 210 includes a vehicle road image processing unit 211 and a steering wheel angle calculation unit 212. The vehicle road image processing unit 211 is configured to receive training data, and randomly shift, rotate, flip, and crop a vehicle road image in the training data to obtain a pre-processed vehicle road image. Specifically, each of the collected vehicle road images is randomly shifted, rotated, and flipped with a certain probability level, then the H*W image is cropped to an IN_H*IN_W pixel, and the large-sized image is cropped into a small image after transformation, which is mainly to prevent the cropped image from appearing in a small range of black frames. When the KW image is cropped, appropriate pixels are selected for cropping according to the size of H*W. When cropping, the proportion of other irrelevant information in the vehicle road image is reduced to the greatest extent, thereby ensuring the proportion of road information in the vehicle road image.

The steering wheel angle calculation unit 212 is configured to calculate a steering wheel angle corresponding to the pre-processed vehicle road image to obtain pre-processed training data. Specifically, the steering wheel angle corresponding to the pre-processed vehicle road image is obtained by calculation. It is obtained by the following transformation formula:

$$\text{steer\_out} = \text{sym\_symbol} * (\text{steer\_init} + \text{pix\_shift} * \alpha - \text{pix\_rotate} * \beta)$$

where α is a transformation coefficient of an angle corresponding to a random shift pixel, and β is a transformation coefficient of a steering wheel rotation angle corresponding to image rotation. steer_out is an angle value corresponding to a transformed image. sym_symbol is a horizontally symmetric identifier of the image, which is an explicit function. When sym_symbol is −1, it indicates horizontal symmetry. When sym_symbol is 1, it indicates no horizontal symmetry. The calculation formula is as follows:

$$\text{sym\_symbol} = \begin{cases} 1 & (f(-T, T) \geq 0) \\ -1 & (f(-T, T) < 0) \end{cases}$$

f(−T,T) represents that a random integer is generated in a [−T, T] closed interval with an equal probability, and T is an integer that is not zero. The following formulas pix_shift and pix_rotate are similar, and M and K both represent non-zero arbitrary integers. The benefit of horizontal symmetry of an image is to balance the habitual tendency of a steering wheel angle of a vehicle in samples when it is not in the middle of a lane. steer_init is a collected original steering wheel angle, and pix_shift is the number of pixels randomly shifted in a horizontal direction. The calculation mode is as follows:

$$\text{pix\_shift} = f(-M, M)$$

A negative number indicates that a sliding frame of a size IN_H*IN_W is shifted to the left on an H*W map, and vice versa. pix_rotate is a rotation angle of an H*W image for rotation transformation. The calculation formula is as follows:

$$\text{pix\_rotate} = f(-K, K)$$

steer_out is an angle value corresponding to a transformed image.

A steering wheel angle corresponding to the pre-processed vehicle road image may be obtained according to the above calculation formula, so as to obtain pre-processed training data.

The training module 220 is configured to perform model training according to the pre-processed training data and the neural network model to obtain a training result. Specifically, model training is performed according to a great amount of pre-processed training data based on the neural network model to obtain a corresponding training result.

Figure 14:
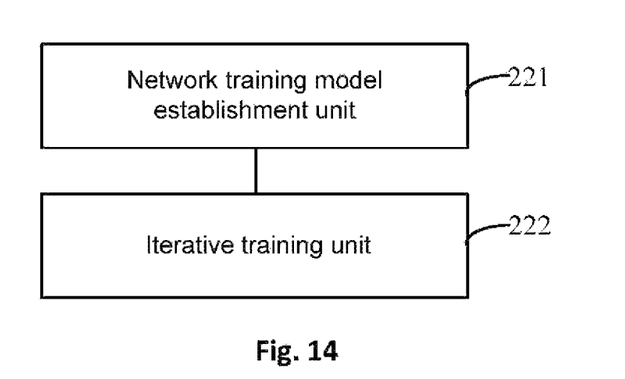
FIG. 14 is a structural schematic diagram of model training in an embodiment.

Further, in an embodiment, referring to FIG. 14, the training module 220 includes a network training model establishment unit 221 and an iterative training unit 222. The network training model establishment unit 221 is configured to establish a network training model based on Tensorflow. Specifically, Tensorflow is an intelligent learning system that transmits complex data structures to an artificial intelligence neural network for analysis and processing. A network training model corresponding to the pre-processed training data is established based on Tensorflow, thereby facilitating subsequent iterative training of the pre-processed training data.

The iterative training unit 222 is configured to perform iterative training on the network training model via the training set data according to the training set data and the neural network model to obtain a training result. Specifically, the training set data is randomly scrambled before the training connection is performed, the correlation between the samples is broken, and the reliability of the training result is increased. Furthermore, in an embodiment, the training data is loaded in batches due to the large capacity of the obtained training data, and the loaded training data of each batch is different according to different configurations of servers for training. The selection can be made according to the actual situation, in order to facilitate the expansion, training data storage and iterative training can be performed by different servers, and data transmission is performed between the two servers through a socket. It can be understood that the training data can be loaded into the network training model at one time under the premise of server configuration permission, and the training data storage and the iterative training can also be performed by the same server.

The model establishment module 230 is configured to establish a DNN model of the vehicle according to the training result. Specifically, based on a Tensorflow network training model, the corresponding training is performed according to the received training data, a training result about the correspondence between the vehicle road image and the steering wheel angle is obtained and saved, and the corresponding DNN model of the vehicle is established according to the training result of a great amount of training data.

Figure 15:
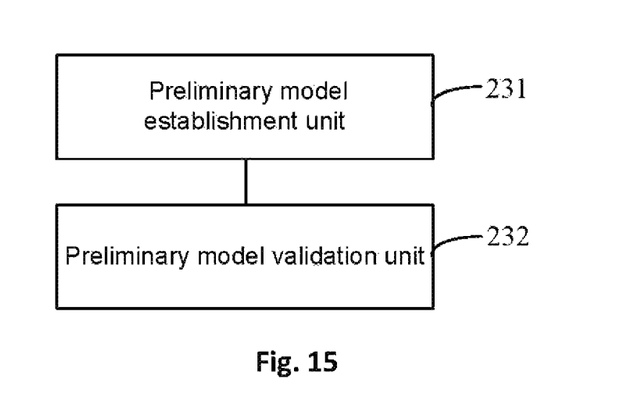
FIG. 15 is a structural schematic diagram of model validation in an embodiment.

Further, in an embodiment, referring to FIG. 15, the training data further includes validation set data, and the model establishment module 230 includes a preliminary model establishment unit 231 and a preliminary model validation unit 232. The preliminary model establishment unit 231 is configured to establish a preliminary model according to the training result. Specifically, based on the Tensorflow network training model and the neural network model, the Tensorflow network training model is iteratively trained according to the training set data, and a correspondence between the vehicle road image and the steering wheel angle is obtained, and a preliminary model is established according to the obtained correspondence. Further, the model training adopts mini-batch SGD as an optimizer, an initial learning rate is δ, the learning rate is exponentially decayed by a coefficient θ, and the learning rate is attenuated after the training times reach a set value. Specifically, the set value is determined according to the experience accumulated by multiple trainings.

The preliminary model validation unit 232 is configured to validate the preliminary model according to the validation set data to obtain a DNN model of the vehicle, Specifically, after performing iterative training according to the training set data, a preliminary model about the correspondence between the vehicle road image and the steering wheel angle is established according to the training result, then the obtained preliminary model is subjected to capability assessment based on the validation set data, and the change trend of the loss value or accuracy of the preliminary model on the validation set determines whether to terminate the training. Further, in order to prevent accidental interruption of a training program, the training result of the model is saved once a certain amount of training data is trained.

Furthermore, in an embodiment, the training data further includes test set data, after the preliminary training is completed according to the training set data and the validation set validates the preliminary model to obtain the DNN model of the vehicle, the obtained DNN model of the vehicle is subjected to model prediction through the test set data, and the performance and classification capabilities of the established DNN model of the vehicle are measured to obtain and output a result. The obtained training data is divided into training set data, validation set data and test set data, which effectively prevents over-fitting of the model and further improves the reliability of the established DNN model of the vehicle.

According to the above-mentioned unmanned lane keeping device, a large amount of real vehicle data is collected as training data, deep learning is performed through a deep neural network to establish a corresponding real vehicle inference model, and during the actual driving process, a corresponding steering, wheel angle can be obtained via the real vehicle inference model according to a collected vehicle road image, so as to control a vehicle to keep driving in a corresponding lane. The characterization of road information can be completed without artificial knowledge, and feature information that has deep internal understanding of a lane and cannot be obtained by artificial knowledge can also be learned by deep learning, lane keeping in a situation of a road segment with non-clear route, large curvature and traffic congestion can be achieved, and the advantage of strong recognition ability is achieved.

The modules in the above unmanned lane keeping device may be implemented in whole or in part by software, hardware, and combinations thereof. Each of the above modules may be embedded in or independent of a processor in a computer device, or may be stored in a memory in the computer device in a software form, so that the processor invokes operations corresponding to the above modules.

Figure 16:
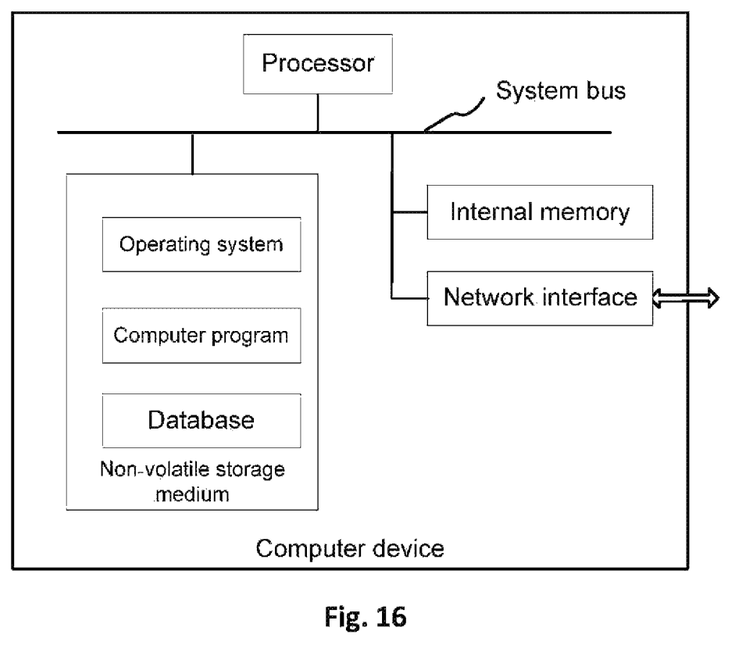
FIG. 16 is an internal structure diagram of a computer device in an embodiment.

In an embodiment, a computer device is provided. The computer device may be a server, and an internal structure diagram thereof may be as shown in FIG. 16. The computer device includes a processor, a memory, a network interface, and a database connected by a system bus. The processor of the computer device is configured to provide calculation and control capabilities. The memory of the computer device includes a non-volatile storage medium and an internal memory. The non-volatile storage medium stores an operating system, a computer program, and a database. The internal memory provides an environment for operation of the operating system and the computer program in the non-volatile storage medium. The database of the computer device is configured to store data in the unmanned lane keeping method. The network interface of the computer device is configured to communicate with an external terminal via a network connection. The computer program is executed by the processor to implement an unmanned lane keeping method.

It will be understood by those skilled in the art that the structure shown in FIG. 16 is only a block diagram of a part of the structure related to the solution of the present disclosure, and does not constitute a limitation of the computer device to which the solution of the present disclosure is applied. The specific computer device may include more or fewer components than those shown in the figures, or combine some components, or have different component arrangements.

In an embodiment, a computer device is provided, which includes a memory and a processor, the memory storing a computer program, wherein when executing the computer program, the processor implements the following steps: a vehicle road image collected by a data, collector of the vehicle is received; the vehicle road image is transmitted to a preset DNN model of the vehicle for processing to obtain a steering wheel angle corresponding to the vehicle road image, wherein the DNN model of the vehicle is established by deep learning, and is used for characterizing a correspondence between the vehicle road image and the steering wheel angle; the vehicle is controlled to keep driving in a corresponding lane according to the steering wheel angle.

In an embodiment, when executing the computer program, the processor further implements the following steps: a corresponding neural network model is established based on a convolutional neural network; and training data is received, and a DNN model of the vehicle is established according to the training data and the neural network model, the training data including real vehicles and records of steering wheel angle.

In an embodiment, when executing the computer program, the processor further implements the following steps: training data is received, and the training data is pre-processed to obtain pre-processed training data; a model training is performed according to the pre-processed training data and the neural network model to obtain a training result; and a DNN model of the vehicle is established according to the training result.

In an embodiment, when executing the computer program, the processor further implements the following steps: training data is received, and a vehicle road image in the training data is randomly shifted, rotated, flipped, and cropped to obtain a pre-processed vehicle road image; and a steering wheel angle corresponding to the pre-processed vehicle road image is calculated to obtain pre-processed training data.

In an embodiment, when executing the computer program, the processor further implements the following steps: a network training model corresponding to the pre-processed training data is established based on Tensorflow; and an Iterative training is performed on the network training model via the training set data according to the training set data and the neural network model to obtain a training result.

In an embodiment, when executing the computer program, the processor further implements the following steps: a preliminary model is established according to the training result; and the preliminary model is validated according to the validation set data to obtain a DNN model of the vehicle.

In an embodiment, when executing the computer program, the processor further implements the steps as follows.

The steering wheel angle is sent to a steering control system, the steering wheel angle being used for the steering control system to control vehicle steering to make the vehicle keep driving in a corresponding lane.

In an embodiment, a computer-readable storage medium is provided, which has a computer program stored thereon, wherein the computer program is executed by a processor to implement the following steps: a vehicle road image collected by a data collector of the vehicle is received; the vehicle road image is transmitted to a preset DNN model of the vehicle for processing to obtain a steering wheel angle corresponding to the vehicle road image, wherein the DNN model of the vehicle is established by deep learning, and is used for characterizing a correspondence between the vehicle road image and the steering wheel angle; and the vehicle is controlled to keep driving in a corresponding lane according to the steering wheel angle.

In an embodiment, the computer program is executed by the processor to implement the following steps: a corresponding neural network model is established based on a convolutional neural network; and the training data is received, and a DNN model of the vehicle is established according to the training data and the neural network model, the training data including real vehicles and records of steering wheel angle.

In an embodiment, the computer program is executed by the processor to implement the following steps: training data is received, and the training data is pre-processed to obtain pre-processed training data; a model training is performed according to the pre-processed training data and the neural network model to obtain a training result; and a DNN model of the vehicle is established according to the training result.

In an embodiment, the computer program is executed by the processor to implement the following steps: training data is received, and a vehicle road image in the training data is randomly shifted, rotated, flipped, and cropped to obtain a pre-processed vehicle road image; and a steering wheel angle corresponding to the pre-processed vehicle road image is calculated to obtain pre-processed training data.

In an embodiment, the computer program is executed by the processor to implement the following steps: a network training model corresponding to the pre-processed training data is established based on Tensorflow; and an Iterative training is performed on the network training model via the training set data according to the training set data and the neural network model to obtain a training result.

In an embodiment, the computer program is executed by the processor to implement the following steps: a preliminary model is established according to the training result; and the preliminary model is validated according to the validation set data to obtain a DNN model of the vehicle.

In an embodiment, the computer program is executed by the processor to implement the following steps: the steering wheel angle is sent to a steering control system, the steering wheel angle being used for the steering control system to control vehicle steering to make the vehicle keep driving in a corresponding lane.

According to the above-mentioned computer device and storage medium, a large amount of real vehicle data is collected as training data, deep learning is performed through a deep neural network to establish a corresponding real vehicle inference model, and during the actual driving process, a corresponding steering wheel angle can be obtained via the real vehicle inference model according to a collected vehicle road image, so as to control a vehicle to keep driving in a corresponding lane. The characterization of road information can be completed without artificial knowledge, and feature information that has deep internal understanding of a lane and cannot be obtained, by artificial knowledge can also be learned by deep learning, lane keeping in a situation of a road segment with non-clear route, large curvature and traffic congestion can be achieved, and the advantage of strong recognition ability is achieved.

Those skilled in the art can understand that all or part of the processes in the above method embodiments may be implemented by a computer program to instruct related hardware, and the computer program may be stored in a nonvolatile computer-readable storage medium. When the computer program is executed, the flow of each method embodiment as described above may be included. Any reference to a memory, storage, database, or other media used in various embodiments provided by the present disclosure may include nonvolatile and/or volatile memories. The nonvolatile memory may include a Read Only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) or an external cache memory. By way of illustration and not limitation, RAM is available in a variety of formats, such as a Static RAM (SRAM), a Dynamic RAM (DRAM), a Synchronous DRAM (SDRAM), a Dual Data Rate SDRAM (DDRSDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The technical features of the above embodiments may be arbitrarily combined. For the sake of brevity of description, all possible combinations of the technical features in the above embodiments are not described. However, as long as there is no contradiction in the combination of these technical features, it is considered to be the range described in this specification.

The above embodiments are merely illustrative of several implementation manners of the present disclosure with specific and detailed description, and are not to be construed as limiting the patent scope of the present invention. It is to be noted that a number of variations and modifications may be made by those of ordinary skill in the art without departing from the conception of the present disclosure, and all fall within the scope of protection of the present disclosure. Therefore, the scope of protection of the present disclosure should be determined by the appended claims.

What is claimed is:

1. An unmanned lane keeping method, comprising the following steps:
   receiving a vehicle road image collected by a data collector of the vehicle;
   transmitting the vehicle road image to a Deep Neural Network (DNN) model of the vehicle for processing to obtain a steering wheel angle corresponding to the vehicle road image, wherein the DNN model of the vehicle is established by deep learning, and is used for characterizing a correspondence between the vehicle road image and the steering wheel angle; and
   controlling the vehicle to keep driving in a corresponding lane according to the steering wheel angle;
   wherein before the step of receiving a vehicle road image collected by a data collector of the vehicle, the method further comprises:
   establishing a corresponding neural network model based on a convolutional neural network; and
   receiving training data and establishing a DNN model of the vehicle according to the training data and the neural network model, the training data comprising real vehicles and records of steering wheel angle;
   wherein the step of receiving training data and establishing a DNN model of the vehicle according to the training data and the neural network model comprises:
   receiving a training data and pre-processing the training data to obtain a pre-processed training data; performing model training according to the pre-processed training data and the neural network model to obtain a training result; and establishing a DNN model of the vehicle according to the training result.

2. The unmanned lane keeping method as claimed in claim 1, wherein the step of receiving training data and pre-processing the training data comprises:
   receiving training data, and randomly shifting, rotating, flipping, and cropping the vehicle road image in the training data to obtain a pre-processed vehicle road image; and
   calculating a steering wheel angle corresponding to the pre-processed vehicle road image to obtain the pre-processed training data.

3. The unmanned lane keeping method as claimed in claim 2, wherein the step of controlling the vehicle to keep driving in a corresponding lane according to the steering wheel angle comprises:
   sending the steering wheel angle to a steering control system, the steering wheel angle being used for the steering control system to control vehicle steering to make the vehicle keep driving in a corresponding lane.

4. The unmanned lane keeping method as claimed in claim 1, wherein the training data comprises training set data, and the step of performing model training according to the pre-processed training data and the neural network model to obtain a training result comprises:
   establishing a network training model corresponding to the pre-processed training data based on Tensorflow; and
   performing iterative training on the network training model via the training set data according to the training set data and the neural network model to obtain the training result.

5. The unmanned lane keeping method as claimed in claim 4, wherein the training data further comprises validation set data, and the step of establishing DNN model of the vehicle according to the training result comprises:
   establishing a preliminary model according to the training result; and
   validating the preliminary model according to the validation set data to obtain a DNN model of the vehicle.

6. The unmanned lane keeping method as claimed in claim 5, wherein the step of controlling the vehicle to keep driving in a corresponding lane according to the steering wheel angle comprises:
   sending the steering wheel angle to a steering control system, the steering wheel angle being used for the steering control system to control vehicle steering to make the vehicle keep driving in a corresponding lane.

7. The unmanned lane keeping method as claimed in claim 4, wherein the step of controlling the vehicle to keep driving in a corresponding lane according to the steering wheel angle comprises:

sending the steering wheel angle to a steering control system, the steering wheel angle being used for the steering control system to control vehicle steering to make the vehicle keep driving in a corresponding lane.

8. The unmanned lane keeping method as claimed in claim 1, wherein the step of controlling the vehicle to keep driving in a corresponding lane according to the steering wheel angle comprises:

sending the steering wheel angle to a steering control system, the steering wheel angle being used for the steering control system to control vehicle steering to make the vehicle keep driving in a corresponding lane.

9. A computer device, comprising a memory and a processor, the memory storing a computer program, wherein when executing the computer program, the processor implements the steps of the method as claimed in claim 1.

10. A non-transitory storage medium, having a computer program stored thereon, wherein the computer program is executed by a processor to implement the steps of the method as claimed in claim 1.

11. The unmanned lane keeping method as claimed in claim 1, wherein the step of controlling the vehicle to keep driving in a corresponding lane according to the steering wheel angle comprises:

sending the steering wheel angle to a steering control system, the steering wheel angle being used for the steering control system to control vehicle steering to make the vehicle keep driving in a corresponding lane.

12. The unmanned lane keeping method as claimed in claim 1, wherein the step of controlling the vehicle to keep driving in a corresponding lane according to the steering wheel angle comprises:

sending the steering wheel angle to a steering control system, the steering wheel angle being used for the steering control system to control vehicle steering to make the vehicle keep driving in a corresponding lane.

13. An unmanned lane keeping device, comprising:
a vehicle road image receiving module receiving a vehicle road image collected by a data collector of the vehicle;
a vehicle road inference module transmitting the vehicle road image to a preset DNN model of the vehicle for processing to obtain a steering wheel angle corresponding to the vehicle road image, wherein the DNN model of the vehicle is established by deep learning, and is used for characterizing a correspondence between the vehicle road image and the steering wheel angle; and
a steering wheel angle control module controlling the vehicle to keep driving in a corresponding lane according to the steering wheel angle;
a neural network model establishment module establishing a corresponding neural network model based on a convolutional neural network;
a DNN model of the vehicle establishment module receiving training data and establishing a DNN model of the vehicle according to the training data and the neural network model, the training data comprising real vehicles and records of steering wheel angle;
wherein the step of receiving training data and establishing a DNN model of the vehicle according to the training data and the neural network model comprises:
receiving training data, and pre-processing the training data to obtain pre-processed training data; performing model training according to the pre-processed training data and the neural network model to obtain a training result and establishing a DNN model of the vehicle according to the training result.

14. The unmanned lane keeping device as claimed in claim 13, wherein the step of receiving training data and pre-processing the training data comprises:
receiving training data, and randomly shifting, rotating, flipping, and cropping a vehicle road image in the training data to obtain a pre-processed vehicle road image; and
calculating a steering wheel angle corresponding to the pre-processed vehicle road image to obtain pre-processed training data.

15. The unmanned lane keeping device as claimed in claim 13, wherein the training data comprises training set data, and the step of performing model training according to the pre-processed training data and the neural network model to obtain a training result comprises:
establishing a network training model corresponding to the pre-processed training data based on Tensorflow; and
performing iterative training on the network training model via the training set data according to the training set data and the neural network model to obtain the training result.

16. The unmanned lane keeping device as claimed in claim 15, wherein the training data further comprises validation set data, and the step of establishing a DNN model of the vehicle according to the training result comprises:
establishing a preliminary model according to the training result; and
validating the preliminary model according to the validation set data to obtain a DNN model of the vehicle.

* * * * *